United States Patent
Hong et al.

(10) Patent No.: US 7,961,012 B2
(45) Date of Patent: Jun. 14, 2011

(54) APPARATUS AND METHOD FOR PREVENTING GENERATION OF GLITCH IN A CLOCK SWITCHING CIRCUIT

(75) Inventors: Heon-Seok Hong, Suwon-si (KR); Yun-Ju Kwon, Suwon-si (KR); Yong-Chan Kim, Seoul (KR)

(73) Assignee: Samsung Electronics Co., Ltd., Maetan-Dong,Yeongtong-Gu, Suwon-Si, Gyeonggi-Do (KR)

( * ) Notice: Subject to any disclaimer, the term of this patent is extended or adjusted under 35 U.S.C. 154(b) by 24 days.

(21) Appl. No.: 12/188,277

(22) Filed: Aug. 8, 2008

(65) Prior Publication Data

US 2009/0039940 A1    Feb. 12, 2009

(30) Foreign Application Priority Data

Aug. 10, 2007   (KR) .................. 10-2007-0080477

(51) Int. Cl.
*H03K 5/00*      (2006.01)

(52) U.S. Cl. ........................................ 327/99; 375/354

(58) Field of Classification Search ............ 327/99–147; 375/354, 357, 371, 373, 360, 355, 356
See application file for complete search history.

(56) References Cited

U.S. PATENT DOCUMENTS

| 6,501,304 | B1 | 12/2002 | Boerstler et al. ............... 327/99 |
| 6,809,556 | B1 | 10/2004 | Bronfer et al. ................. 327/99 |
| 6,819,150 | B1 | 11/2004 | Santosa et al. ............... 327/141 |
| 7,039,146 | B2 | 5/2006 | Chiu ........................... 375/373 |

*Primary Examiner* — Lincoln Donovan
*Assistant Examiner* — Diana J. Cheng
(74) *Attorney, Agent, or Firm* — Cha & Reiter, LLC

(57) ABSTRACT

An apparatus and for preventing a glitch in a clock switching circuit includes a select signal manager and a clock gate unit. The select signal manager generates a detect change signal, provides the detect change signal as an input signal for generating a clock gate signal to the clock gate unit, and changes a muxsel signal into a select signal using the clock gate signal to select a clock intending for switching. Upon receiving the detect change signal, the clock gate unit gates a received clock, generates the clock gate signal using a level of the detect change signal as an input signal, and provides the generated clock gate signal to the select signal manager.

13 Claims, 5 Drawing Sheets

APPARATUS AND METHOD FOR PREVENTING GENERATION OF GLITCH IN A CLOCK SWITCHING CIRCUIT

CLAIM OF PRIORITY

This application claims priority under 35 U.S.C. §119(a) from a Korean Patent Application entitled "APPARATUS AND METHOD FOR PREVENTING GENERATION OF GLITCH IN A CLOCK SWITCHING CIRCUIT" filed in the Korean Intellectual Property Office on Aug. 10, 2007 and assigned Serial No. 2007-80477, the contents of which are herein incorporated by reference in its entirety.

BACKGROUND OF THE INVENTION

1. Field of the Invention

The present invention relates generally to a semiconductor integrated circuit. More particularly, the present invention relates to an apparatus and method for preventing a system error caused by circuit synchronization and control disable circumstances upon the generation of a glitch when switching clocks.

2. Description of the Related Art

Semiconductor integrated circuits use clocks for the synchronization and control of logic circuits, flip-flop circuits and the like. In recent years, semiconductor integrated circuits provide a diversity of functions. The semiconductor integrated circuits integrating a diversity of functions include certain functions that require more clock sources than other functions, thus requiring a process of switching between many clocks.

A conventional clock switching technology performs switching without addressing a glitch of a clock caused by a select signal of a multiplexer. However, if a glitch is generated upon the switching of clocks, such a glitch has adverse effects upon a system, often making the system unstable.

FIGS. 1A and 1B are diagrams illustrating the generation of a glitch in a conventional clock switching circuit.

In FIG. 1A, a clock switching circuit outputs one of two clock signals, i.e., a first clock signal 100, or a second clock signal 102, by using a select signal (SEL) 104 for clock selection.

In FIG. 1B, a clock switching method can output either a first clock 110, or a second clock 120, depending on a value of select signal 130. When select signal 130 is low, clock signal 110 (clk 1) is output. When select signal 130 is high, clock signal 120 (clk 2) is output.

However, upon switching between the clocks 110 and 120, a glitch 140 is generated by a timing difference between the clocks 110 and 120.

In other words, upon switching between the clocks 110 and 120, a glitch is typically generated and may give rise to circuit synchronization problems and control disable problems, thus having a very bad impact upon a system.

Methods for preventing the generation of a glitch have been proposed to solve the glitch problem. However, these methods are mostly technologies for switching between two clocks, or switching to avoid generating a glitch considering a clock switching time or a relationship between the clocks.

For example, there has been previously proposed a method for removing a glitch by counting a predetermined value during a first clock and a second clock change interval while fixing a clock output CLOCK_OUT. This method is suitable when there is no change of a frequency difference between two clocks and switching between two clocks. However, the aforementioned method has problems when there is a large frequency difference between two clocks, or when there is switching between three or more clocks.

In addition to the above method, there is also a method that operates upon detecting a change of a select signal, and in response, gating a first clock and synchronizing a select signal of a multiplexer to a second clock that is a second clock, thus enabling the clock switching and removing a glitch. The above method also has problems when the number of clocks is three or more.

SUMMARY OF THE INVENTION

The present invention provides an apparatus and method for preventing the generation of a glitch in a clock switching circuit, and in particular upon the use of a plurality of clocks.

According to one exemplary aspect of the present invention, an apparatus for preventing a glitch in a clock switching circuit includes a select signal manager and a clock gate unit. The select signal manager generates a detect change signal, provides the detect change signal as an input signal for generating a clock gate signal to the clock gate unit, and changes/converts a muxsel signal into a select signal using the clock gate signal to select a particular clock for switching. Upon receiving the detect change signal, the clock gate unit gates a received clock, generates the clock gate signal using a level of the detect change signal as an input signal, and provides the generated clock gate signal to the select signal manager.

According to another exemplary aspect of the present invention, a method for preventing a glitch in a clock switching circuit includes generating a detect change signal that is an input signal for generating a clock gate signal, gating a received clock, and generating the clock gate signal using a level of the detect change signal as an input signal, and changing/converting a muxsel signal into a select signal using the clock gate signal to select a clock intending for switching.

BRIEF DESCRIPTION OF THE DRAWINGS

The above and other exemplary objects, features and advantages of the present invention will become more apparent from the following detailed description when taken in conjunction with the accompanying drawings in which.

DETAILED DESCRIPTION

Preferred exemplary embodiments of the apparatus and method for preventing generation of glitch in a clock switching circuit will be described herein below with reference to the accompanying drawings. In the following description, well-known functions or constructions may not be described in detail when their inclusion would obscure appreciation of the invention by a person of ordinary skill in the art.

The examples provided herein below have been provided merely for illustrative purposes and the claimed invention is no way limited to the examples shown and described herein.

Figure 1A:
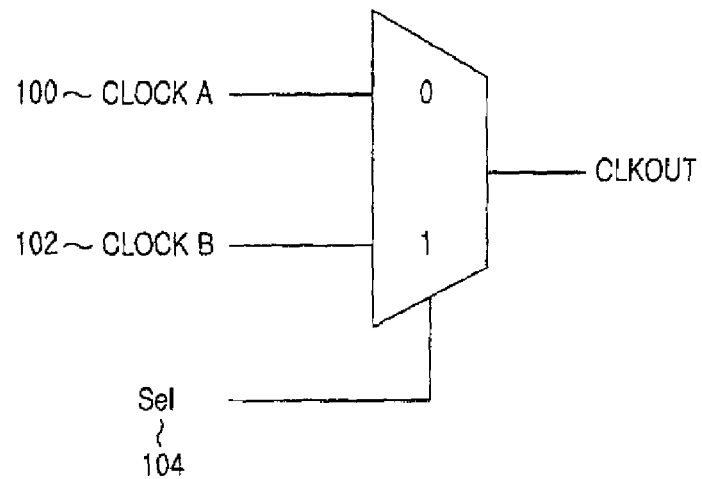
FIGS. 1A and 1B are diagrams illustrating the generation of a glitch in a clock switching circuit according to the conventional art.
Figure 1B:
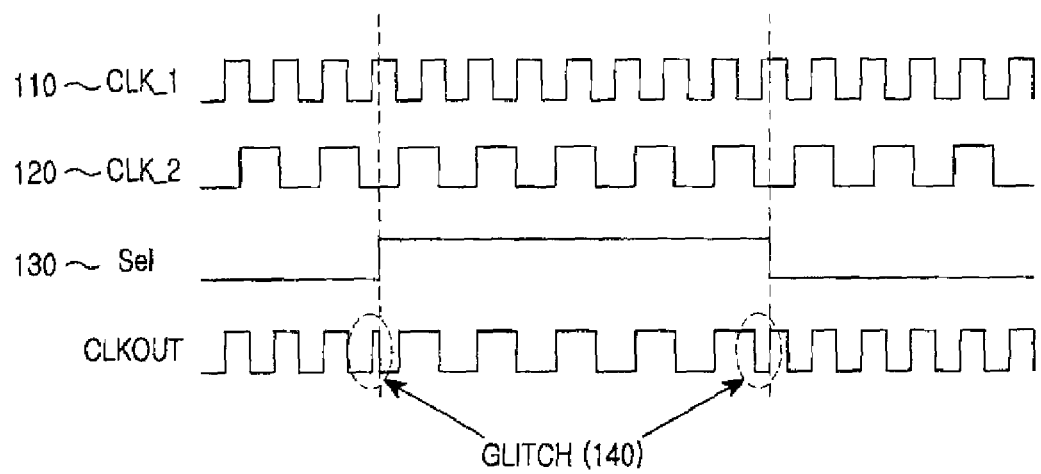
Figure 2:
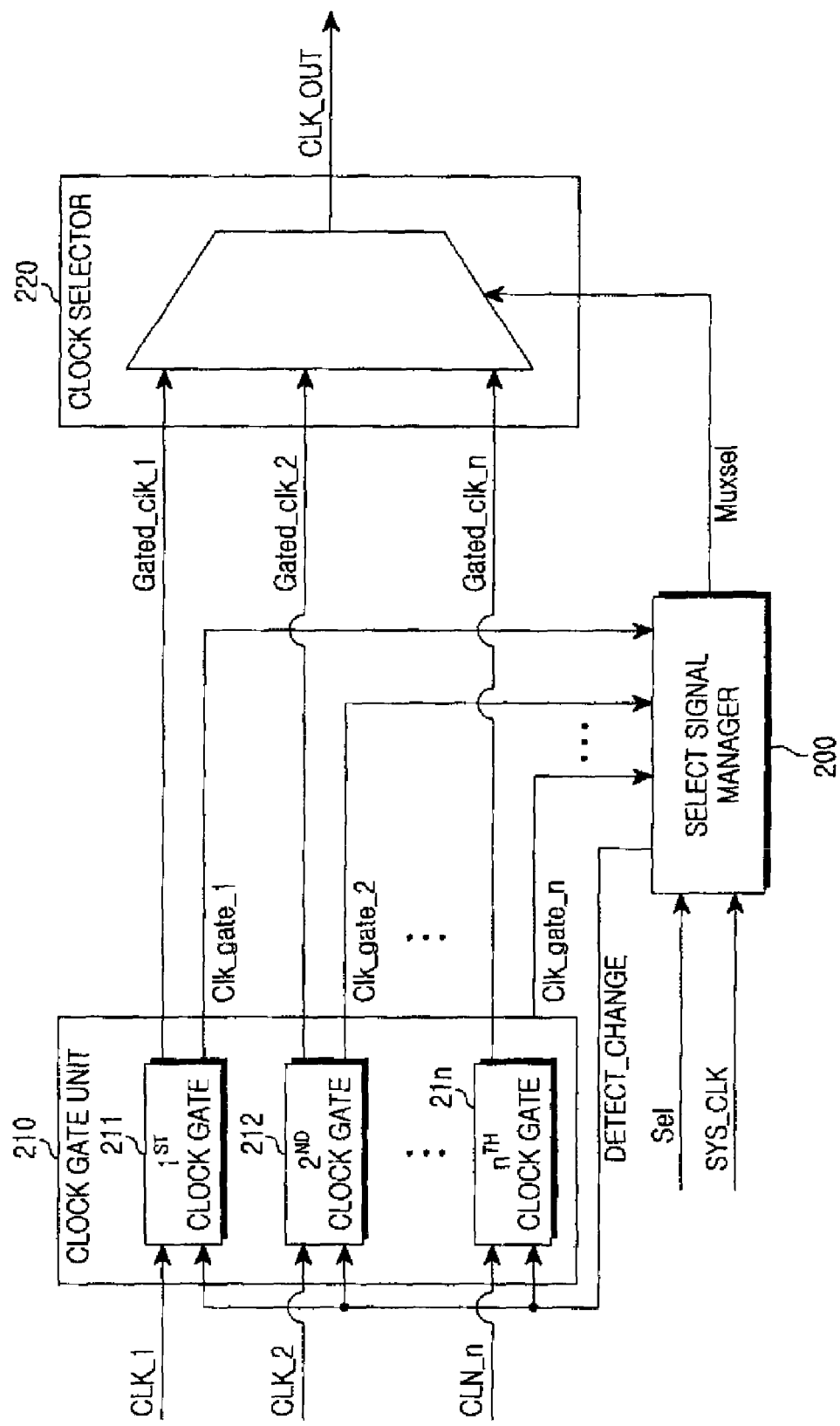
FIG. 2 is a block diagram illustrating a construction of a clock switching circuit according to an exemplary embodiment of the present invention.

FIG. 2 is a block diagram illustrating a construction of a clock switching circuit according to an exemplary embodiment of the present invention.

Referring to FIG. 2, the switching circuit may include, for example, a select signal manager 200, a clock gate unit 210, and a clock selector 220.

Prior to describing a construction of the switching circuit, a general operation of the switching circuit is described herein below.

The switching circuit enables the select signal manager 200 to generate and provide a "detect change signal" (Detect_change) that is an input signal to the clock gate unit 210.

The detect change signal (Detect_change), which is an input signal of the clock gate unit 210, can be generated when there is a change of a level of a select signal Sel (an input to the select signal manager 200).

The switching circuit enables the clock gate unit 210 to provide clock gate signals CLK_gate_1, CLK_gate_2, and CLK_gate_n to the select signal manager 200 using the detect change signal (Detect_change).

In addition, the switching circuit enables the select signal manager 200 to generate an update muxsel signal (Update_muxsel). The update muxsel signal is a reference signal for selecting a clock for switching.

In other words, upon receiving all the clock gate signals CLK_gate_1, CLK_gate_2, and CLK_gate_n, the switching circuit toggles a level of the update muxsel signal Update_muxsel, thus changing, during the toggling interval, a level of a muxsel signal Muxsel corresponding to a positive edge of a system clock Sys_clk into a level of a select signal Sel and provides the muxsel signal Muxsel to the clock selector 220.

The switching circuit enables the clock selector 220 to perform a switching process. That is, under control of the switching circuit, the clock selector 220 selects a clock by the level of the muxsel signal Muxsel received from the select signal manager 200 and outputs a clock output Clk_out.

A construction of a clock switching circuit according to an exemplary embodiment of the present invention is described in detail herein below with reference to FIG. 2.

In the switching circuit shown in FIG. 2, a select signal manager 200 generates a detect change signal Detect_change through a comparison between a select signal Sel for clock selection and a level of a muxsel signal Muxsel representing a clock presently output from a clock selector 220, and provides the generated Detect_change to a clock gate unit 210.

Upon identifying a change of a level of the select signal Sel, the select signal manager 200 compares the select signal Sel with the muxsel signal Muxsel. Then, if it is determined that there is a difference between the levels of the select signal Sel and the muxsel signal Muxsel, the select signal manager 200 generates and provides a detect change signal Detect_change to the clock gate unit 210.

By toggling a level of a detect change signal Detect_change of a current state, the select signal manager 200 generates the detect change signal Detect_change. According to an exemplary method of the switching circuit according to the present invention, the select signal manager 200 generates the detect change signal Detect_change by toggling the detect change signal Detect_change from LOW to HIGH or toggling the detect change signal Detect_change from HIGH to LOW.

Still referring to FIG. 2, the select signal manager 200 generates an update muxsel signal Update_muxsel using a clock gate signal for each clock received from the clock gate unit 210, thus changing the level of the muxsel signal Muxsel into the level of the select signal Sel that is provided to the clock selector 220. The update muxsel signal Update_muxsel is a signal for changing the muxsel signal Muxsel into the select signal Sel to select a clock intending for switching.

In other words, according to this exemplary aspect of the invention, when identifying reception of all clock gate signals CLK_gate_1, CLK_gate_2, . . . ,CLK_gate_n from the clock gate unit 210, the select signal manager 200 toggles the update muxsel signal Update_muxsel, thus providing, during the toggling interval, a level of a muxsel signal Muxsel corresponding to a positive edge of a system clock Sys_clk to the clock selector 220.

The clock gate unit 210 may be comprised of, for example, a plurality of clock gates, i.e., a first clock gate 211, a second clock gate 212, . . . , an $n^{th}$ clock gate 21n. Upon receiving a detect change signal (Detect_change) from the select signal manager 200, the clock gate unit 210 gates received clocks CLK_1, CLK_2, . . . , CLK_n, generates clock gate signals CLK_gate_1, CLK_gate_2, . . . ,CLK_gate_n using the detect change signal Detect_change as an input signal, and provides the clock gate signals CLK_gate_1, CLK_gate_2, . . . ,CLK_gate_n to the select signal manager 200.

Upon receiving the detect change signal Detect_change, the clock gate unit 210 toggles clock gate signals CLK_gate_1, CLK_gate_2, . . . ,CLK_gate_n corresponding to respective clock gates at negative edges of respective clocks CLK_1, CLK_2, . . . , CLK_n and provides the toggled clock gate signals CLK_gate_1, CLK_gate_2, . . . ,CLK_gate_n to the select signal manager 200.

Until before receiving a muxsel signal Muxsel changed into a select signal Sel from the select signal manager 200, the clock selector 220 outputs gated clocks Gated_clk_1, Gated_clk_2, . . . , Gated_clk_n gated by the clock gate unit 210. Then, if receiving the multiplex muxsel signal (Muxsel), the clock selector 220 performs a process of switching between clocks using the muxsel signal Muxsel.

Figure 3:
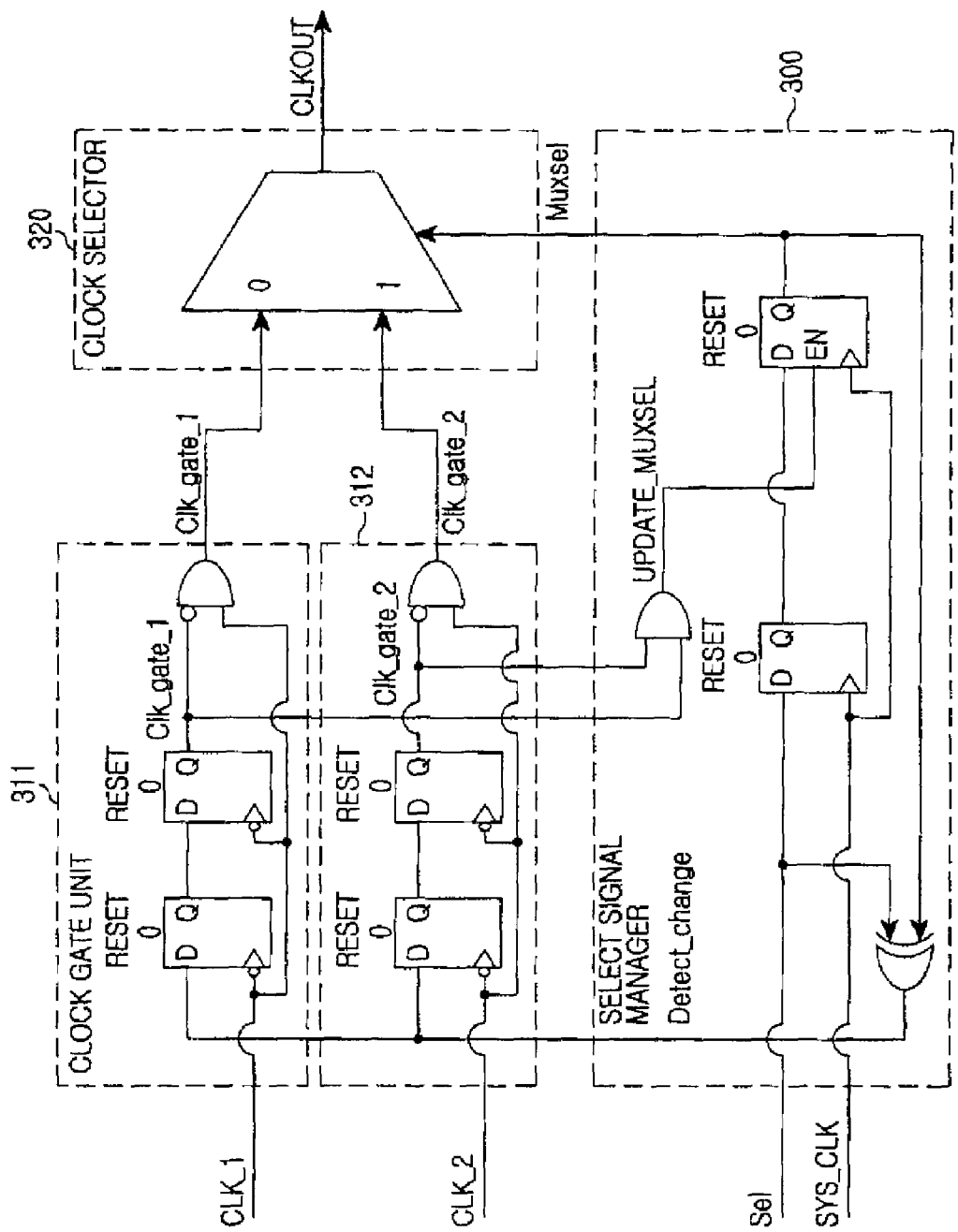
FIG. 3 is a circuit diagram illustrating a clock switching circuit including two clock gates according to an exemplary embodiment of the present invention.

Now with reference to FIG. 3, a description of the switching circuit for generating the update muxsel signal Update_muxsel to prevent the generation of a glitch depending on a change of the select signal Sel is discussed herein.

FIG. 3 is a circuit diagram illustrating a circuit for restoring the generated update muxsel signal Update_muxsel according to an exemplary embodiment of the present invention. FIG. 3 shows a clock switching circuit including two clock gates, i.e., a first clock gate 311 and a second clock gate 312 according to an exemplary embodiment of the present invention. The switching circuit is exemplified using the block diagram of FIG. 2 and is described below with reference to FIG. 2. Additionally, in the description herein below, FIG. 4 is a timing diagram illustrating an operation of a clock switching circuit according to another exemplary embodiment of the present invention.

Figure 4:
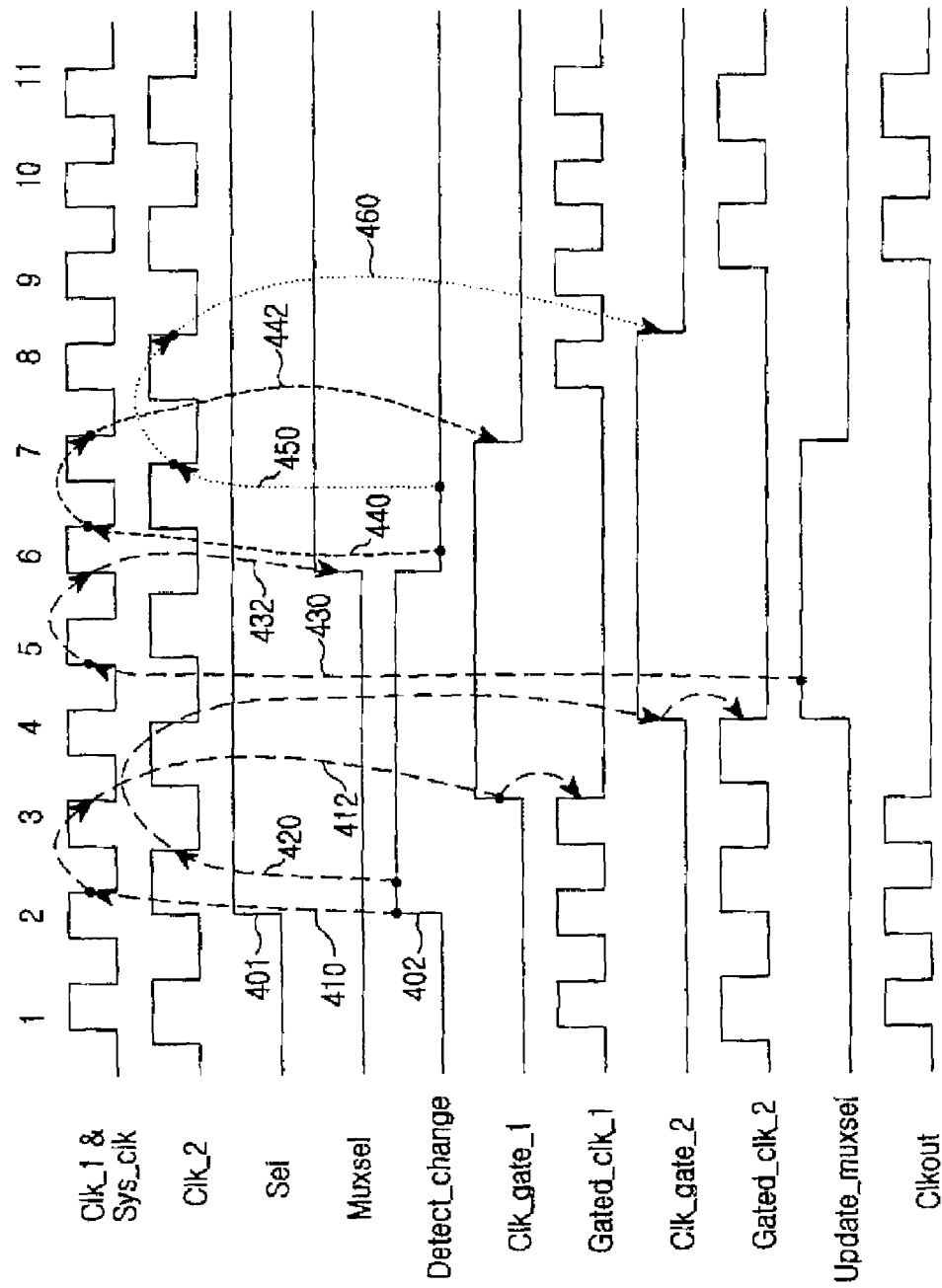
FIG. 4 is a timing diagram illustrating an operation of a clock switching circuit according to an exemplary embodiment of the present invention.

Referring to the examples shown in FIGS. 3 and 4, a select signal manager 300 of the switching circuit compares a select signal Sel with a muxsel signal Muxsel when identifying that there is a change (401, FIG. 4) of a level of the select signal Sel.

The muxsel signal Muxsel refers to a signal selecting a clock by a clock selector 320 from input clocks to the clock selector 320, and the clock selected using the muxsel signal Muxsel is outputted from the clock selector 320.

When the comparison result indicates there is a difference between logic levels of the select signal Sel and the muxsel signal Muxsel, the select signal manager 300 toggles 402 a detect change signal Detect_change from a logic LOW to HIGH, as shown in FIG. 4.

The detect change signal Detect_change can be toggled from a logic LOW to HIGH, or from HIGH to LOW, depending on a realization method of the switching circuit.

Then, the select signal manager 300 provides the HIGH-toggled detect change signal Detect_change as an input signal to each clock gate unit 210 i.e., a first clock gate 311 and a second clock gate 312. Upon receiving the detect change signal Detect_change, the clock gate unit toggles 412 and 422 clock gate signals Clk_gate_1 and Clk_gate_2 corresponding to respective clocks Clk_1 and Clk_2 from LOW to HIGH at negative edges 410 and 420 of the respective clocks Clk_1 and Clk_2 and provides the toggled clock gate signals Clk_gate_1 and Clk_gate_2 to the select signal manager 300.

In addition, the clock signals input to the clock gate unit 210 are gated as LOW levels to the clock selector 320.

Upon receiving the clock gate signals (Clk_gate_1 and Clk_gate_2), which correspond to the clocks Clk_1 and Clk_2, the select signal manager 300 identifies the received clock gate signals Clk_gate_1 and Clk_gate_2 and generates an update muxsel signal Update_muxsel.

In other words, the select signal manager 300 changes the update muxsel signal Update_muxsel from LOW to HIGH during an interval during which the clock gate signals Clk_gate_1 and Clk_gate_2 are all in HIGH levels, thereby generating the update muxsel signal Update_muxsel.

Then, the select signal manager 300 changes the logic level of the muxsel signal Muxsel into the level of the select signal Sel during an interval during which the update muxsel signal Update_muxsel is in a HIGH level, and provides the muxsel signal Muxsel to the clock selector 320.

Here, the select signal manager 300 toggles the logic level of the muxsel signal Muxsel at a positive edge of the system clock Sys_clk during the interval and provides the toggled muxsel signal Muxsel to the clock selector 320. The system clock Sys_clk uses the fastest one of clocks used in a system, thus enabling quick clock switching.

Upon receiving the toggled muxsel signal Muxsel, the clock selector 320 selects a clock according to the toggled muxsel signal Muxsel, thus changing a clock output Clkout and performing a process of clock switching.

The execution of the clock switching process leads to a change of the level of the muxsel signal Muxsel, thus making the levels of the select signal Sel and the muxsel signal Muxsel identical with each other.

When the muxsel signal Muxsel has the same logic level as the select signal Sel as above 430, the select signal manager 300 toggles 432 the detect change signal Detect_change from logic HIGH to LOW and provides the toggled detect change signal Detect_change as an input signal to the clock gate unit 210.

Upon receiving the detect change signal Detect_change, the clock gate unit 210 i.e., a first clock gate 311 and a second clock gate 312 toggles 442 and 460 the clock gate signals Clk_gate_1 and Clk_gate_2 corresponding to the respective clocks Clk_1 and Clk_2 from logic HIGH to LOW at negative edges 440 and 450 of the respective clocks Clk_1 and Clk_2 and provides the toggled clock gate signals Clk_gate_1 and Clk_gate_2 to the select signal manager 300.

The switching circuit then outputs a clock switched ON and selected by the clock selector 320.

Figure 5:
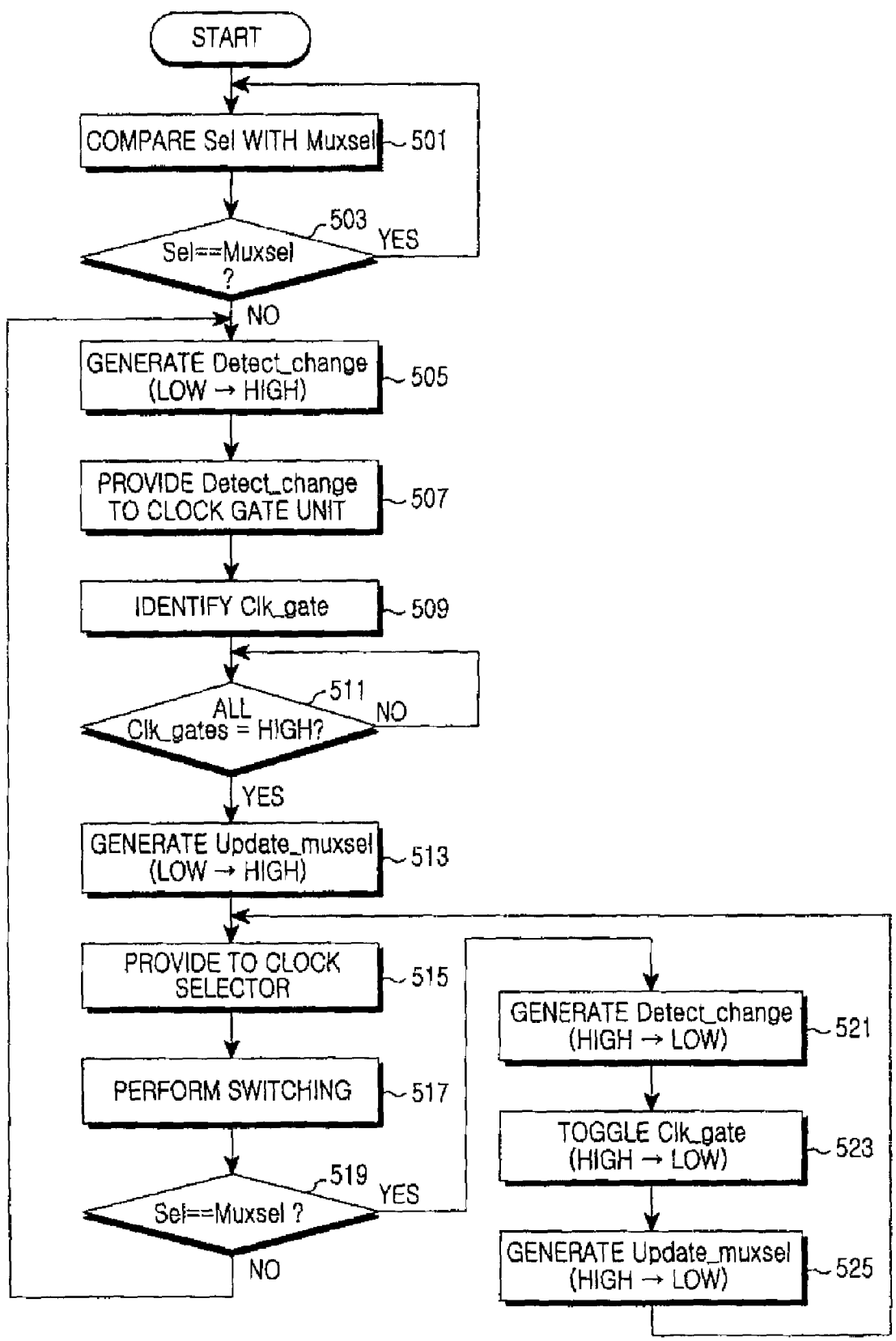
FIG. 5 is a flow diagram illustrating a switching process for preventing the generation of a glitch in a switching circuit according to an exemplary embodiment of the present invention.

FIG. 5 is a flow diagram illustrating a switching process for preventing the generation of a glitch in a switching circuit according to an exemplary embodiment of the present invention.

Referring now to FIG. 5, when identifying by a select signal manager 200 that there is a change of a level of a select signal Sel, the switching circuit compares the select signal Sel with a muxsel signal Muxsel in step 501 and identifies if the signals Sel and Muxsel have the same level in step 503.

If the signals Sel and Muxsel have the same level at step 503, the switching circuit repeatedly performs step 501 and 503.

However, at step 503, after identifying that the signals Sel and Muxsel have a different level, the switching circuit enables the select signal manager 200 to generate a detect change signal (Detect_change) in step 505.

With regard to step 505, the generating of the detect change signal (Detect_change) can be implemented by allowing the select signal manager 200 under control of the switching circuit to either toggle the detect change signal Detect_change from logic LOW to HIGH, or toggle the detect change signal Detect_change from HIGH to LOW in accordance with a realization method of the switching circuit. According to an exemplary embodiment of FIG. 3, the select signal manager 200 toggles the detect change signal from logic LOW to HIGH.

In step 507, the switching circuit provides the generated detect change signal Detect_change as an input signal to each clock gate unit 210. Upon receiving the detect change signal Detect_change as an input signal, the clock gate unit 210 toggles a clock gate signal Clk_gate corresponding to each clock from LOW to HIGH at a negative edge of each clock and provides the toggled clock gate signal Clk_gate to the select signal manager 200.

In step 509, the switching circuit enables the select signal manager 200 to identify the clock gate signal Clk_gate received from the clock gate unit 210 and, in step 511, enables the select signal manager 200 to identify a level of the clock gate signal Clk_gate received from the clock gate unit 210.

When identifying that the clock gate signals Clk_gate are all in HIGH levels, the switching circuit enables the select signal manager 200 to generate an update muxsel signal (Update_muxsel) in step 513.

Under control of the switching circuit, the select signal manager 200 can generate the update muxsel signal Update_muxsel by changing a level of the update muxsel signal Update_muxsel into a HIGH level during an interval during which the clock gate signals Clk_gate received from the clock gate unit 210 are all in HIGH levels.

In step 515, the switching circuit enables the select signal manager 200 to generate the level of the muxsel signal Muxsel during an interval during which the update muxsel signal Update_muxsel is in a HIGH level, and provides the muxsel signal Muxsel to a clock selector 220. Here, the select signal manager 200 toggles the level of the muxsel signal Muxsel at a positive edge of a system clock Sys_clk during the interval and provides the toggled muxsel signal Muxsel to the clock selector 220. Also, the system clock Sys_clk uses the fastest one of clocks used in a system, thus enabling quick clock switching.

In step 517, the perform switching step occurs, wherein the switching circuit enables the clock selector 220 to select a clock using the level of the received muxsel signal Muxsel, thus changing a clock output Clkout and performing a process of clock switching. In step 519, the switching circuit compares the select signal Sel with the muxsel signal Muxsel and determines whether the signals Sel and Muxsel have the same level.

If the signals Sel and Muxsel have a different level, the switching circuit repeatedly performs step 505 and its subsequent steps.

When identifying that the levels of the signals Sel and Muxsel are made identical by a change of the level of the muxsel signal Muxsel resulting from the execution of the switching, the switching circuit proceeds to step 521 and enables the select signal manager 200 to toggle the detect change signal (Detect_change) from HIGH to LOW and provide the toggled detect change signal (Detect_change) as an input signal to the clock gate unit 210.

In step 523, the switching circuit enables the clock gate unit 210 to toggle a clock gate signal Clk_gate corresponding to each clock from logic HIGH to LOW at a negative edge of each clock and provide the toggled clock gate signal Clk_gate to the select signal manager 200.

In step 525, the switching circuit enables the select signal manager 200 to generate an update muxsel signal Update_muxsel toggled from HIGH to LOW using the clock gate signal Clk_gate. Then, the switching circuit repeatedly performs step 515 and its subsequent steps.

If operating as above, the switching circuit outputs a clock switched ON and selected by the clock selector 220.

As described above, a clock switching circuit according to an exemplary embodiment of the present invention performs a process of clock switching for preventing the generation of a glitch irrespective of a correlation of a clock frequency and the like and when there are a number of clocks, for example, at least two or greater, or three or greater.

Also, compared to a conventional clock switching circuit used for only when using two clocks, a clock switching circuit according to an exemplary embodiment of the present invention can prevent the generation of a glitch even when using 'N' number of clocks, thus enhancing a system stability.

While the invention has been shown and described with reference to certain preferred embodiments thereof, it will be understood by those skilled in the art that various changes in form and details may be made therein without departing from the spirit and scope of the invention as defined by the appended claims. For example, it is within the spirit and cope of the claimed invention that the logic High and Low signals could be triggered by opposite values.

What is claimed is:

1. An apparatus for preventing a glitch in a clock switching circuit, the apparatus comprising:
   a clock gate unit having a plurality of clock gates;
   a select signal manager for generating a detect change signal (Detect_change) based on a level of a select signal SEL being input to the select signal manager, for providing the detect change signal to each clock gate as an input signal for generating the respective clock gate signal, and for generating a muxsel signal based on all the clock gate signals to a signal input to the select signal manager for toggling a logic value of the muxsel signal based on a comparison with the select signal, for selecting a particular clock for switching; and
   said each clock gate for gating a received clock, for generating the clock gate signal using a level of the detect change signal received as an input signal to said clock gate, and for providing the generated clock gate signal to the select signal manager according to the received detect change signal: and
   a clock selector for, prior to receiving the muxsel signal changed into a select signal from the select signal manager, outputting a clock gated by the clock gate unit and, when receiving the muxsel signal, switching to a clock based on the received muxsel signal;
   wherein an output of each respective clock gate of the plurality of clock gates is input to a respective input of the clock selector such that the select signal manager generates an updated muxsel signal having a same logic level as the select signal.

2. The apparatus of claim 1, wherein, when the select signal has a different logic level from the muxsel signal by a change of a level of the select signal, the select signal manager generates the detect change signal and, when the select signal has the same level as the muxsel signal, restores the generated detect change signal.

3. The apparatus of claim 1, wherein the select signal manager generates the update muxsel signal for generating the muxsel signal to select a particular clock for switching using the respective clock gate signal received from the clock gate unit.

4. The apparatus of claim 1, wherein the select signal manager toggles a level of the muxsel signal at a positive edge or negative edge of a system clock during an interval during which the level of the update muxsel signal is toggled.

5. The apparatus of claim 1, wherein the clock gate unit is comprised of a plurality of clock gates.

6. The apparatus of claim 5, wherein the clock gate unit toggles the clock gate signal using the detect change signal received from the select signal manager as an input signal at a positive edge or negative edge of each clock and provides the toggled clock gate signal to the select signal manager.

7. A method for preventing a glitch in a clock switching circuit, the method comprising:
   generating a detect change signal that comprises an input signal for generating a respective clock gate signal for a clock gate unit having a plurality of clock gates based on a level of a select signal SEL being input to a select signal manager;
   gating a received clock for each clock gate of said plurality of clock gates, and generating the respective clock gate signal using a level of the detect change signal received as the input signal to said each dock gate; and
   generating a muxsel signal based on all the clock gate signals to select a clock for switching, wherein the generating of the detect change signal is performed through a comparison between the select signal and the muxsel signal,
   wherein prior to receiving the select signal, outputting the gated clock by the clock gate unit, and
   when receiving the muxsel signal, switching to a clock based on the muxsel signal, wherein the muxsel signal has a same logic level as the select signal.

8. The method of claim 7, wherein, wherein the select signal has a different level from the muxsel signal, the detect change signal is generated and, when the select signal has the same level as the muxsel signal, the generated detect change signal is restored.

9. The method of claim 7, wherein changing the muxsel signal into the select signal by generating an update muxsel signal for changing the muxsel signal into the select signal, and changing a level of the muxsel signal into a level of the select signal.

10. The method of claim 9, wherein, after generating the update muxsel signal, the level of the muxsel signal is toggled at a positive edge or negative edge of a system clock during an interval during which a level of the update muxsel signal is toggled.

11. The method of claim 10, wherein when receiving all clock gate signals from respective clock gates, the update muxsel signal is generated.

12. The method of claim 11, wherein the clock gate signal is received from a plurality of clock gates.

13. The method of claim 12, wherein the clock gate signal is generated by toggling a clock gate signal at a positive edge or negative edge of each clock using the detect change signal as an input signal.

* * * * *